United States Patent [19]

Yanai et al.

[11] Patent Number: 5,080,976
[45] Date of Patent: Jan. 14, 1992

[54] BLADE AND METHOD FOR PREPARATION THEREOF

[75] Inventors: Noriyuki Yanai; Masahiro Watabe, both of Yokohama, Japan

[73] Assignee: Canon Kabushiki Kaisha, Tokyo, Japan

[21] Appl. No.: 309,861

[22] Filed: Feb. 14, 1989

[30] Foreign Application Priority Data

Feb. 19, 1988 [JP] Japan .................. 63-36910

[51] Int. Cl.$^5$ .................................................. B32B 27/40
[52] U.S. Cl. ............................ 428/423.1; 355/299; 524/267; 524/376; 528/70
[58] Field of Search ............... 528/70; 355/299; 524/267, 376; 428/423.1

[56] References Cited

U.S. PATENT DOCUMENTS

| 4,098,742 | 7/1978 | Mueller | 528/70 |
| 4,247,196 | 1/1981 | Ogawa et al. | 355/15 |

FOREIGN PATENT DOCUMENTS

| 7037385 | 3/1982 | Japan . |
| 7128376 | 8/1982 | Japan . |
| 7201276 | 12/1982 | Japan . |
| 7201277 | 12/1982 | Japan . |
| 9005259 | 1/1984 | Japan . |
| 9015967 | 1/1984 | Japan . |

OTHER PUBLICATIONS

Japanese References Considered to the Extent of English Abstract.

*Primary Examiner*—Merrell C. Cashion, Jr.
*Assistant Examiner*—D. S. Nakarani
*Attorney, Agent, or Firm*—Fitzpatrick, Cella, Harper & Scinto

[57] ABSTRACT

A blade comprising a polymeric elastomer containing a low surface energy compound, wherein the low surface energy compound exists in the polymeric elastomer as primary particles with an average particle size of 1 μm or less or the low surface energy compound is in a mutually dissolved state in the polymeric elastomer, and a method for preparation thereof.

A blade comprising a molded product obtained by curing a silicone-modified prepolymer formed by the reaction of a polyurethane prepolymer and silicone oil in a solvent, and a method for preparation thereof.

13 Claims, 2 Drawing Sheets

10 μm

BLADE AND METHOD FOR PREPARATION THEREOF

BACKGROUND OF THE INVENTION

1. Field of the Invention

This invention relates to a blade, particularly to a cleaning blade for cleaning and removing by scraping the toner remaining on the surface of an electrophotographic photosensitive member surface.

2. Related Background Art

A blade article is molded in the shape of a plate comprising a rubber elastomer and has been used, for example, for cleaning and removing foreign matter attached on a flat surface by moving physically in contact with the surface.

On the other hand, in an electrophotographic photosensitive member assembled in an electrophotographic copying machine or a laser beam printer, the cleaning characteristics of the surface are very important, and as one cleaning method, the residual toner on the photosensitive member is cleaned and removed by contacting a blade comprising a polymeric elastomer such as urethane rubber, chloroprene rubber, ethylene-propylene diene rubber, nitrile rubber, etc. with the electrophotographic photosensitive member.

When residual toner on the photosensitive member is to be cleaned with a rubber blade, rubber generally has a high in coefficient of friction and yet also excessive in abrasion, and therefore when used forcibly, it will be subject to rapid and nonuniform abrasion, causing defective cleaning to occur or, and in an extreme case, will damage the photosensitive member surface.

In order to improve durability, lubricity, and the cleaning characteristics by improvement of such points, there have been made contrivances such as incorporation of a compound with low surface energy and having lubricity, such as silicone oil, etc. into the polymeric elastomer.

For example, as disclosed in Japanese Patent Laid-open Application No. 57-37385, a cleaning blade is formed by the addition of a silicone oil before crosslinking of a urethane rubber, or as disclosed in Japanese Patent Laid-open Application No. 59-15967, with the mold surface being coated with a silicone oil, a urethane is injected into the mold to carry out the reaction, thereby forming a cleaning blade. Also, as disclosed in Japanese Patent Laid-open Application No. 57-128376, Japanese Patent Laid-open Application No. 57-201276, Japanese Patent Laid-open Application No. 57-201277, a polyester is mixed and reacted with an organic diisocyanate to form a prepolymer, and the prepolymer formed is mixed with a low surface energy compound such as silicone oil, polysiloxane oil or modified polysiloxane oil, etc., followed by heating curing to mold a cleaning blade. Further, as disclosed in Japanese Patent Laid-open Application No. 59-5259, the prepolymer obtained by reacting silicone oil with an isocyanate is coated on a cleaning blade comprising a urethane, followed by heating to carry out the reaction, thereby molding a blade.

However, when cleaning is performed with a blade comprising a polymeric elastomer containing a low surface energy compound molded according to the method of the prior art, due to scraping between the blade and the photosensitive surface with progress of repeated successive copying of electrophotographic process, the blade edge portion will be nonuniformly abraded. For this reason, the cleaning effect of residual toner will be lowered to a great extent, whereby there has been involved the problem that no sufficient durability can be obtained.

Also, as the copying machine or laser beam printer has been recently made higher in speed recently, a photosensitive member of high durability and long life has been developed, which can stand even 100,000 sheets of successive copying. Such a photosensitive member is constituted of an inorganic material such as amorphous silicon, and its surface hardness is very hard (in the case of amorphous silicon drum, Vickers hardness of 1500 to 2000 $Kg/cm^2$). When a blade of the prior art is applied to such a photosensitive member of and long durability, high life, there is the problem that durability is insufficient, and the blade must be exchanged frequently, and it has been desired to have a blade of high durability which can correspond to such a photosensitive member of high durability and long life under the present situation.

SUMMARY OF THE INVENTION

According to the investigations by the present inventors, such problems as nonuniform abrasion of the blade edge portion or durability is based on nonuniformity of the blade. In other words, in a blade comprising a polymeric elastomer containing silicone oil which is a low energy compound molded by the method of the prior art, unreacted silicone oil or hardened product thereof exists in large particles in the polymeric elastomer. The size of the particles may be equal to or greater than the toner particle size (around 10 $\mu$m), and therefore it may be considered that by scraping the photosensitive surface, the particle components in the polymeric elastomer will drop off, and the residual toner will pass through such defective portion of the blade, thereby ensuring the problems as mentioned above.

An object of the present invention is to provide a blade in which a low surface energy compound such as silicone oil exists under uniform state in a polymeric elastomer and a method for preparation thereof.

Another object of the present invention is to provide a blade having excellent durability, lubricity and cleaning characteristics, and a method for preparation thereof.

A further object of the present invention is to provide a highly durable cleaning blade for a electrophotographic photosensitive member, which is free from nonuniform abrasion at the edge portion by repeated uses in electrophotographic processes, and has excellent capability for cleaning and removing residual toner.

According to one aspect of the present invention, there is provided a blade comprising a polymeric elastomer containing a low surface energy compound, characterized in that the low surface energy compound exists in the polymeric elastomer as primary particles with an average particle size of 1 $\mu$m or less or in a mutually dissolved state.

According to another aspect of the present invention, there is provided a method for preparing a blade, which comprises curing and molding a prepolymer obtained by reacting a polymeric elastomer forming material with a low surface energy compound having active groups reactive with said polymeric elastomer forming material in a solvent in which at least one of said polymeric elastomer forming material or said low surface energy compound is soluble.

According to a further aspect of the present invention, there is provided a blade, which is obtained by curing and molding a silicone-modified prepolymer formed by a polyurethane prepolymer and silicone oil in a solvent.

According to still another aspect of the present invention, there is provided a method for preparing a blade, which comprises curing a silicone-modified prepolymer formed by the reaction of a polyurethane prepolymer and silicone oil in a solvent.

Also, the present invention is a cleaning blade for an electrophotographic photosensitive member for cleaning the photosensitive surface thereof by scraping the electrophotographic photosensitive surface, characterized in that the low surface energy compound exists in the polymeric elastomer as primary particles with an average particle size of 1 $\mu$m or less or in a mutually dissolved state.

Also, the present invention is a cleaning blade for an electrophotographic photosensitive member comprising a polymeric elastomer containing a low surface energy compound for cleaning the photosensitive surface by scraping the electrophotographic photosensitive surface, characterized in that it is molded by curing a silicone-modified prepolymer formed by the reaction of a polyurethane prepolymer and silicone oil in a solvent.

Also, the present invention is a method for preparation of a blade for a cleaning blade for electrophotographic photosensitive member for cleaning the photosensitive surface by scraping the electrophotographic photosensitive surface, which comprises curing a silicone-modified prepolymer formed by the reaction of a polyurethane prepolymer and silicone oil in a solvent.

DETAILED DESCRIPTION OF THE INVENTION

Figure 1:
FIG. 1 is a photograph by microscope with a magnification of 400-fold of a cross-section of the blade prepared in Example 1 of the present invention.

The blade according to the present invention has a low surface energy compound existing as primary particles with an average particle size of 1 $\mu$m or less preferably existing in a mutually dissolved state. This state is the state in which the low surface energy compound has reacted substantially completely with the polymeric elastomer forming material. In other words, no low surface energy compound exists as nonuniform large particles in the polymeric elastomer, but the low surface energy compound has reacted with the polymeric elastomer forming material to exist in a uniform state. For this reason, during cleaning of residual toner on a photosensitive member, no drop-out of the low surface energy compound which the nonuniform portion of the blade will occur as in the prior art by scraping between the blade and the photosensitive member surface, but the edge portion is abraded constantly uniformly. Therefore, the cleaning removal ability is dramatically improved to give a constantly good cleaning effect.

Also, in the blade of the present invention, the low surface energy compound does not exist as large particles, but correspondingly under the state with the compound having completely reacted with the polymeric elastomer forming material, and therefore the ratio of the low surface energy compound in the polymeric elastomer is higher as compared with the blade of the prior art. For this reason, the lubricity of the low surface energy compound can be efficiently utilized, and therefore abrasion resistance in repeated uses can be also improved.

In the blade according to the present invention, the existing state of the low surface energy compound in the polymeric elastomer is observed using observing the blade strip by a microscope having a magnification of 400-fold, and the average particle size of 10 particles randomly selected from the particulate low surface energy compounds in a unit area of 100 $\mu$m $\times$ 100 $\mu$m is determined, and the mutually dissolved state means that the low surface energy compound is bound as chemically integrated with the polymeric elastomer forming material to be substantially uniformly reacted therewith, whereby no particulate low surface energy compound is substantially observed.

The polymeric elastomer in the present invention is a polymer exhibiting rubber elasticity such as urethane rubber, various diene rubbers, thermoplastic elastomers, etc., and particularly a urethane rubber is preferred with respect to mechanical strength, abrasion resistance, ozone resistance, and reactivity with low surface energy compound.

The low surface energy compound in the present invention is a lubricant having one or more active groups reactive with the polymeric elastomer forming material such as hydroxyl groups, amino groups, carboxyl groups, etc., and preferably an oily liquid lubricant. Examples of such low surface energy compounds may include silicone compounds, fluorine compounds and composites thereof, including those as represented by the structural formulae shown below.

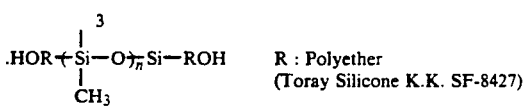

R : Polyether
(Toray Silicone K.K. SF-8427)

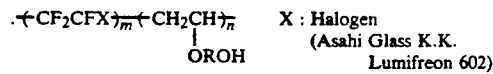

X : Halogen
(Asahi Glass K.K.
Lumifreon 602)

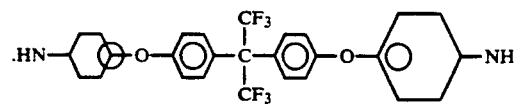

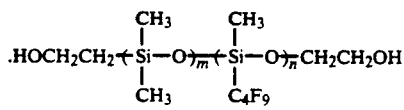

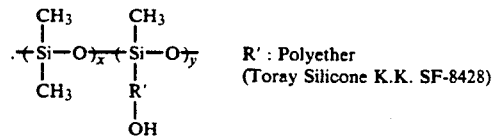

R' : Polyether
(Toray Silicone K.K. SF-8428)

-continued

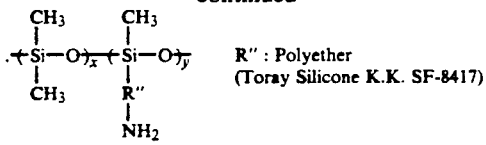

R'': Polyether
(Toray Silicone K.K. SF-8417)

Among them, particularly a silicone oil such as modified polysiloxane oil, etc. is preferred with respect to lubricity and reactivity.

The method for preparing the blade according to the present invention is characterized in that, in carrying out the reaction between a polymeric elastomer forming material and a low surface energy compound having active group reactive with the polymeric elastomer forming material, a solvent in which at least one of the polymeric elastomer forming material and the low surface energy compound is soluble is used.

In the following, the preparation method in the case of using a urethane rubber is described, and in this case, a silicone-modified prepolymer formed by the reaction of a polyurethane prepolymer and a silicone oil in a solvent is cured and molded, as described specifically below.

That is, first, a condensed polyester is formed by the reaction of ethylene glycol with adipic acid. To the condensed polyester is added an excess of diisocyanate to carry out the reaction, thereby forming a polyurethane prepolymer. The polyurethane prepolymer and the low surface energy compound are mixed with monochlorobenzene which is the solvent, stirred to be dissolved therein, followed by heating to carry out the reaction. In this case, the polyurethane prepolymer or the silicone oil may be once dissolved in monochlorobenzene, and the silicone oil or the polyurethane prepolymer may be mixed and dissolved in the solution.

Then, after completion of the reaction, monochlorobenzene is removed under reduced pressure to form a silicone-modified prepolymer. However, in this case, the condensed polyester, the diisocyanate and the silicone oil may be subjected to the reaction at the same time to form a silicone-modified prepolymer.

As the next step, to the silicon-modified prepolymer are added 1,4-butane diol, trimethylolpropane which are curing agents, followed by heating curing to mold a desired blade.

Here, the solvent has the action of solvating two kinds of starting materials incompatible with each other (silicone oil and polyurethane prepolymer) to prevent agglomeration mutually between the same kind of starting materials and form a uniform solution. In the uniform solution, the starting materials exist in the molecular units to undergo the reaction, thereby forming a polymer. After the reaction, since both materials are parts of the polymer, no agglomeration, etc. will occur even after removal of the solvent to give a completely uniform silicone-modified prepolymer.

On the other hand, when no solvent is used as in the prior art, the modified silicone oil will be agglomerated to exist in oil droplets in the prepolymer. The oil reacts in particulate form with isocyanate in the prepolymer, whereby the silicone component is localized in particulate form to give a nonuniform structure.

The blade molded according to the method of the present invention has no large particulate low surface energy compound existing therein, and can form a uniform blade. Also, even a solvent which can dissolve only one of the materials can approximate to more uniform reaction as compared with the prior art method, and also the viscosity of the solution can be lowered, whereby the low surface energy compound exists as primary particles with an average particle size of 1 μm or less, and the blade can exhibit sufficient effect also for cleaning of residual toner, etc.

The solvent which can be used in the present invention should be preferably one with a solubility parameter positioned in the vicinity of that of the polymeric elastomer forming material or the low surface energy compound, or positioned between the polymeric elastomer forming material and the low surface energy compound. Its amount may depend on the solubility, but appropriately 50 to 1000 parts by weight based on 100 parts by weight of the total amount of the polymeric elastomer forming material and the low surface energy compound in order to control the particle size to 1 μm or less. By varying the solvent quantity, the particle size of the low surface energy compound can be controlled.

As the curing agent, 1,4-butane diol, trimethylolpropane, 1,6-hexane diol, trimethylolethane, isopropanolamine, dichloroaniline, etc. can be used.

If necessary, additives such as tetraethylenediamine, 2-ethylhexylimidazole, dibutyltin dilaurate as the reaction catalyst or a defoaming agent may be also added.

The content of the low surface energy compound in the present invention may be generally 3 to 200 parts by weight, preferably 5 to 30 parts by weight based on 100 parts by weight of the polymeric elastomer forming material.

The hardness of the blade may be preferably within the range of from 50° to 90° by JIS A scale.

The blade according to the present invention has uniform abrasion characteristic and abrasion resistance, and therefore is applicable not only to cleaning blade for electrophotographic photosensitive member, but also to cleaning blade for off-set printing drum, roll coater, or other various uses.

The present invention is described in detail by referring to Examples.

EXAMPLE 1

|  | wt. parts |
|---|---|
| Polymeric elastomer forming materials: | |
| Condensed polyester of ethylene glycol and adipic acid M.W. = 1500 | 100 |
| Diphenylmethane-4,4'-diisocyanate | 50.6 |
| Low surface energy compound: | |
| Silicone oil | 18.0 |
| $\text{HOR}-\text{Si}(\text{CH}_3)-\text{O})_n-\text{Si}-\text{ROH}$    R: Polyether (SF-8427, Toray Silicone K. K.) | |
| Curing agent: | |
| 1,4-Butane diol | 6.5 |
| Trimethylolpropane | 3.5 |
| Solvent: | |
| Chlorobenzene | 500 |

The above polyester dehydrated was reacted with diphenylmethane-4,4'-diisocyanate to form a polyurethane prepolymer. The polyurethane prepolymer was dissolved in chlorobenzene, and then silicone oil was thrown into the resultant solution, and the reaction was carried out at 80° C. for 4 hours, followed by removal of chlorobenzene under reduced pressure to form a silicone-modified prepolymer. Then, 1,4-butane diol and trimethylolpropane which are curing agents are mixed together, and curing by heating was effected to mold a transparent blade in which the urethane component and the silicone oil component were completely dissolved with each other. FIG. 1 shows a photograph of a cross-section of the blade by use of a microscope with a magnification of 400-fold. The blade had a hardness of 66° by JIS A scale.

EXAMPLE 2

A blade was molded in the same manner as in Example 1 except that the amount of chlorobenzene which is the solvent was changed to 300 parts by weight. In the blade, silicone oil cured product existed as primary particles with an average particle size of 0.2 μm, and the blade was translucent. Also, the blade had a hardness of 65°.

EXAMPLE 3

A blade was molded in the same manner as in Example 1 except that the amount of chlorobenzene which is the solvent was changed to 150 parts by weight. In the blade, silicone oil cured product existed as primary particles with an average particle size of 1.0 μm, and the blade was translucent. Also, the blade had a hardness of 63°.

EXAMPLE 4

|  | wt. parts |
|---|---|
| Polymeric elastomer forming materials: | |
| Condensed polyester of ethylene glycol and adipic acid M.W. = 1500 | 100 |
| Diphenylmethane-4,4'-diisocyanate | 49.0 |
| Low surface energy compound: | |
| Fluorine compound | 19.1 |
| $+CF_2CFX+_m+CH_2CH+_n$ <br>                    \| <br>                    OROH    X: Halogen <br> (Lumifreon, Asahi Glass K. K.) | |
| Curing agent: | |
| 1,4-Butane diol | 6.5 |
| Trimethylolpropane | 3.5 |
| Solvent: | |
| Chlorobenzene | 500 |

The above polyester dehydrated was reacted with diphenylmethane-4,4'-diisocyanate to form a polyurethane prepolymer. The polyurethane prepolymer was dissolved in chlorobenzene having the fluorine compound previously dissolved therein, and the reaction was carried out at 80° C. for 4 hours, followed by removal of chlorobenzene under reduced pressure to form a fluorine-modified prepolymer. Then, 1,4-butane diol and trimethylolpropane which are curing agents are mixed together, and curing by heating was effected to mold a transparent blade in which the urethane component and the fluorine compound component were completely dissolved with each other. The blade had a hardness of 67°.

EXAMPLE 5

|  | wt. parts |
|---|---|
| Polymeric elastomer forming materials | |
| Condensed polyester of butylene glycol and adipic acid M.W. = 1500 | 100 |
| Diphenylmethane-4,4'-diisocyanate | 50.6 |
| Low surface energy compound | |
| Silicone oil (SF-8427, Toray Silicone K.K.) | 18.0 |
| Solvent: dehydrated methylene chloride | 400 |
| Curing agent | |
| 1,6-Hexane diol | 7.0 |
| Trimethylolethane | 3.0 |

The polyester, the diisocyanate, the silicone oil and the solvent were mixed at the same time to carry out the reaction at 40° C. for 24 hours, followed by removal of methylene chloride under reduced pressure, to obtain a silicone-modified prepolymer. Then, 1,6-hexane diol and trimethylolethane which are curing agents were mixed together, and curing by heating was effected to obtain a transparent blade. The blade had a hardness of 63° by JIS A scale.

EXAMPLE 6

|  | wt. parts |
|---|---|
| Polymeric elastomer forming materials: | |
| Condensed polyester of ethylene glycol and adipic acid M.W. = 2000 | 100 |
| Diphenylmethane-4,4'-diisocyanate | 45.5 |
| Low surface energy compound: (fluorosilicone oil) | |
| $\text{HOCH}_2\text{CH}_2+\underset{\underset{\text{CH}_3}{\|}}{\text{Si}}-\text{O}+_m+\underset{\underset{\text{C}_4\text{F}_9}{\|}}{\text{Si}}-\text{O}+_n\text{CH}_2\text{CH}_2\text{OH}$ | 17.5 |
| 1,4-Butane diol | 6.5 |
| Trimethlolpropane | 3.5 |
| Dehydrated 2-butanone | 500 |

The polyester was reacted with the diisocyanate to form a polyurethane prepolymer. Into the prepolymer was thrown the fluorosilicone oil dissolved previously in dehydrated 2-butanone, and the reaction was carried out under stirring at 60° C. for 8 hours to synthesize a fluorosilicone-modified prepolymer. The prepolymer was mixed with 1,4-butane diol and trimethylolpropane which are curing agents and curing by heating was effected to obtain a transparent blade. The blade had a JIS A hardness of 63°.

COMPARATIVE EXAMPLE 1

|  | wt. parts |
|---|---|
| Condensed polyester of ethylene glycol and adipic acid M.W. = 1500 | 100 |
| Diphenylmethane-4,4'-diisocyanate | 50.6 |
| Silicone oil (SF-8427, Toray Silicone K.K.) | 18.0 |
| 1,6-Butane diol | 6.5 |
| Trimethylolpropane | 3.5 |

Figure 2:
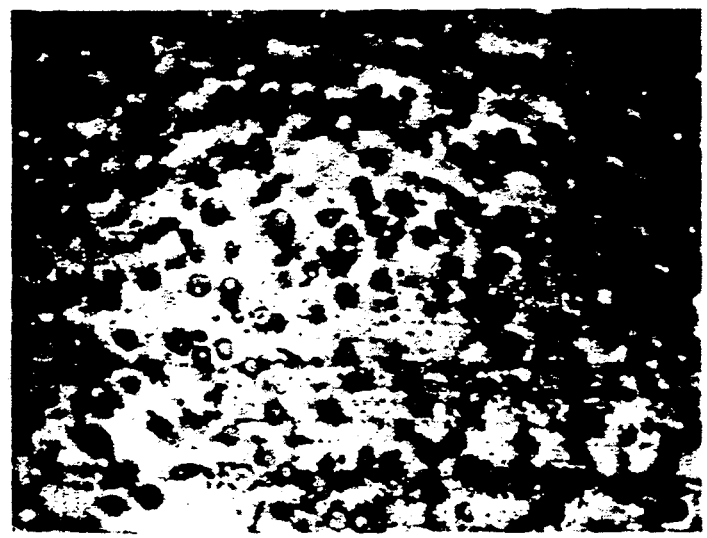
FIG. 2 is a photograph by microscope with a magnification of 400-fold of a cross-section of the blade prepared in Comparative example 1.

The above polyester dehydrated was reacted with diphenylmethane-4,4'-diisocyanate to form a polyurethane prepolymer. The prepolymer was mixed under stirring with the silicone oil to carry out the reaction at 80° C. for 4 hours to form a silicone-modified prepolymer. Then, curing by heating was effected by mixing with 1,4-butanediol and trimethylolpropane which are curing agents to mold a blade. In the blade, the silicone oil cured produce existed as primary particles with an average particle size of 10 μm, and the blade had a milky white color. FIG. 2 shows a photograph of a cross-section of the blade photographed similarly as in Example 1. The blade had a hardness of 62°.

COMPARATIVE EXAMPLE 2 cleaning blade 1 is mounted within the cleaning means 2. This is constructed such that charging on a rotating photosensitive member 3 is performed by means of a charger 4, then exposure effected by an imagewise exposure means 5 to form an electrostatic latent image, which electrostatic latent image is developed by a developer 6, and the toner image visualized is transferred by a transfer charger 9 onto an image-receiving member 8, followed by cleaning of the residual toner not transferred onto the photosensitive member by the cleaning blade 1.

The results are shown in Table 1.

TABLE 1

|  | Example 1 | Example 2 | Example 3 | Example 4 | Example 5 | Example 6 | Comparative Example 1 | Comparative Example 2 |
|---|---|---|---|---|---|---|---|---|
| Average particle size of low surface energy compound in polymeric elastomer (μm) | Mutually dissolved | 0.2 | 1 | Mutually dissolved | Mutually dissolved | Mutually dissolved | 10 | — |
| Silicone component concentration contained in polyurethane base rubber* | 2.5 | 2 | 1.5 | — | — | — | 1 | — |
| Cleaning characteristic | Good image without black streak recognized after 200,000 sheets | Good image without black streak recognized after 200,000 sheets | Good image without black streak recognized after 200,000 sheets | Good image without black streak recognized after 200,000 sheets | Good image without black streak recognized after 200,000 sheets | Good image without black streak recognized after 200,000 sheets | Thin black streak generated after 70,000 sheets, many black streaks generated after 110,000 sheets | Many black streaks generated after 60,000 sheets |
| Amount of abraded blade** after successive copying of 200,000 sheets (μm²) | 14 | 20 | 26 | 18 | 19 | 18 | 81 | 250 |

*Si atom component in the polyurethane base rubber portion detected by XMA (X-ray microanalyzer), and its intensity ratio is represented.
**Amount of abraded blade is measured by cutting the blade in the vertical direction relative to the longer length direction, observing its cross-section, comparing with the cross-section at the initial stage of successive copying, and measuring the area at the cross-section abraded as the amount of abraded blade after successive copying.

|  | wt. parts |
|---|---|
| Condensed polyester of ethylene glycol and adipic acid M.W. = 1500 | 100 |
| Diphenylmethane-4,4'-diisocyanate | 43.1 |
| 1,4-Butane diol | 5.6 |
| Trimethylolpropane | 3.0 |

The above polyester dehydrated was reacted with diphenylmethane-4,4'-diisocyanate to form a polyurethane prepolymer, which was then mixed with 1,4-butane diol and trimethylolpropane which are curing agents to effect heating curing, thereby molding a blade. The blade had a JIS A hardness of 65°.

The blades molded as described above were each mounted as the cleaning blade on an electrophotographic copying machine (NP-7550, produced by Canon) by use of an amorphous silicon drum as the photosensitive member, and copying was performed for evaluation of cleaning characteristic and abrasion characteristic.

Figure 3:
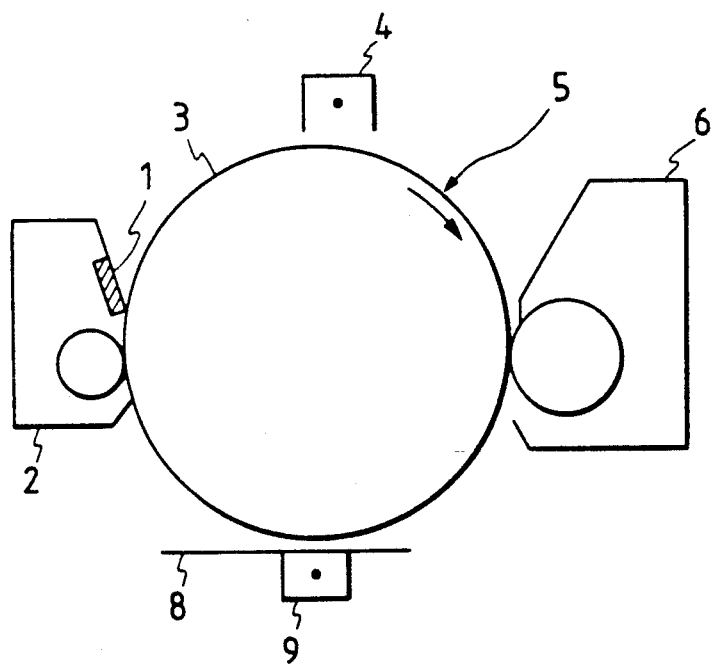
FIG. 3 is a schematic illustration of the main parts of an electrophotographic copying machine.

FIG. 3 shows a construction of the main parts of the electrophotographic copying machine, in which the As is also apparent from the results in Table 1, the blade according to the present invention had very little abrasion at the edge portion, and also no defective image such as black streak, etc. accompanied with nonuniform abrasion was recognized, thus exhibiting good cleaning characteristic. On the other hand, the blade of Comparative example 1 with an average particle size of 10 μm of the low surface energy compound generated defective images with nonuniform abrasion at the blade edge portion due to drop-out of the particle components, etc., whereby the cleaning characteristic was low. Also, marked abrasion by successive copying was seen. Also, as in Comparative example 2, the blade containing no low surface energy compound was found to be remarkably inferior in abrasion by successive copying.

As described above, according to the present invention, a blade in which a low surface energy compound exists under uniform state in a polymeric elastomer can be obtained. Also, there is no nonuniform abrasion, good cleaning characteristic can be maintained semipermanently, and yet abrasion resistance in prolonged use can be improved.

We claim:

1. A blade comprising a polymeric elastomer containing a low surface energy compound, wherein said compound exists in the polymeric elastomer as primary particles with an average particle size of 1 μm or less or wherein said low surface energy compound is in a mutually dissolved state in the polymeric elastomer.

2. A blade according to claim 1, wherein the polymeric elastomer is polyurethane.

3. A blade according to claim 2, wherein the low surface energy compound is silicone oil.

4. A blade according to claim 2, wherein the low surface energy compound is a fluorine compound.

5. A blade according to claim 2, wherein the low surface energy compound is a composite material of a silicone compound and a fluorine compound.

6. A blade according to any one of claim 1 to 5, wherein the blade is a cleaning blade for electrophotographic photosensitive material which cleans the photosensitive material surface by scraping the electrophotographic photosensitive member.

7. A method for preparing a blade containing a low surface energy compound in a polymeric elastomer, which comprises curing and molding a prepolymer obtained by reacting a polymeric elastomer forming material with a low surface energy compound having active groups reactive with said polymeric elastomer forming material in a solvent in which at least one of said polymeric elastomer forming material or said low surface energy compound is soluble.

8. A method for preparing a blade according to claim 7, wherein the polymeric elastomer forming materials are a condensed polyester and diphenylmethane-4,4'-diisocyanate.

9. A method for preparing a blade according to claim 8, wherein the low surface energy compound is selected form the group consisting of silicone compounds, fluorine compounds and composites thereof.

10. A method for preparing a blade according to claim 7, wherein a curing agent is used during curing of the polymer.

11. A blade, comprising a molded product obtained by curing a silicone-modified prepolymer formed by the reaction of a polyurethane prepolymer and silicone oil in a solvent.

12. A blade according to claim 11, wherein the blade is a cleaning blade for electrophotographic photosensitive material which cleans the photosensitive material surface by scraping the electrophotographic photosensitive member.

13. A method for preparing a blade, which comprises curing a silicone-modified prepolymer formed by reacting a polyurethane prepolymer with silicone oil by dissolving them in a solvent in which at least one of the polyurethane prepolymer or the silicone oil is soluble.

* * * * *

UNITED STATES PATENT AND TRADEMARK OFFICE
CERTIFICATE OF CORRECTION

PATENT NO. : 5,080,976  Page 1 of 3
DATED : January 14, 1992
INVENTOR(S) : Yanai et al.

It is certified that error appears in the above-identified patent and that said Letters Patent is hereby corrected as shown below:

COLUMN 1

Line 10, "member surface." should read --member.--.

COLUMN 2

Line 6, "speed recently," should send --speed,--;
    Line 14, "and long durability," should read --high durability and long life,--;
    Line 15, "high life," should be deleted; and
    Line 48, "a" (second occurrence) should read --an--.

COLUMN 4

Line 12, "using" should read --by--;
    Line 13, "by" should read --using--;
    Line 41,

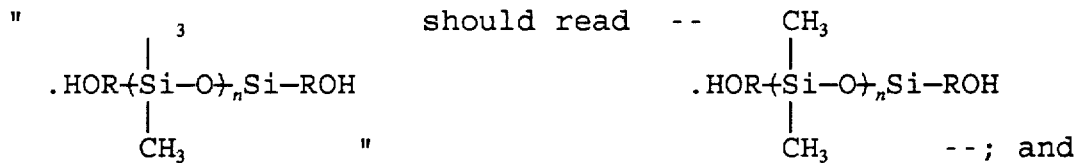

--; and

UNITED STATES PATENT AND TRADEMARK OFFICE
CERTIFICATE OF CORRECTION

PATENT NO. : 5,080,976

DATED : January 14, 1992

INVENTOR(S) : Yanai et al.

It is certified that error appears in the above-identified patent and that said Letters Patent is hereby corrected as shown below:

COLUMN 4

Line 54,

" 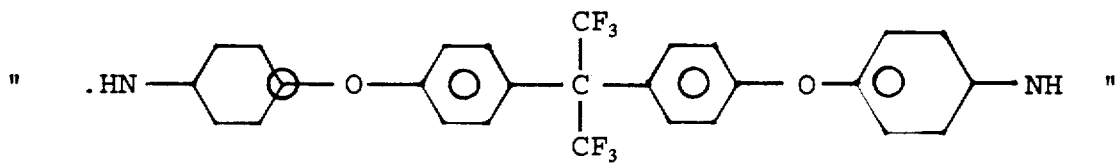 "

should read

-- 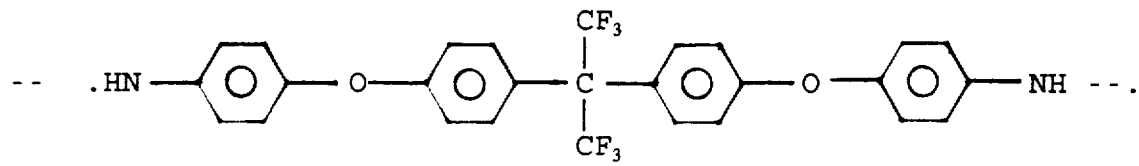 --.

COLUMN 8

Line 41, "Trimethlolpropane" should read
--Trimethylolpropane--.

COLUMN 9

Line 6, "oil cured produce" should read --oil-cured product--.

UNITED STATES PATENT AND TRADEMARK OFFICE
CERTIFICATE OF CORRECTION

PATENT NO. : 5,080,976　　　　　　　　Page 3 of 3
DATED : January 14, 1992
INVENTOR(S) : Yanai et al.

It is certified that error appears in the above-identified patent and that said Letters Patent is hereby corrected as shown below:

COLUMN 11

Line 19, "claim 1 to 5," should read --claims 1 to 5,--.

Signed and Sealed this

Twenty-first Day of September, 1993

Attest:

BRUCE LEHMAN

Attesting Officer　　　　Commissioner of Patents and Trademarks